United States Patent Office 3,194,665
Patented July 13, 1965

3,194,665
METHOD FOR MAKING MARGARINE OF REDUCED TENDENCY TO SPATTER AND PRODUCT OBTAINED THEREBY
Hermann Pardun, Cleves, Germany, assignor to Lever Brothers Company, New York, N.Y., a corporation of Maine
No Drawing. Filed May 11, 1961, Ser. No. 109,280
Claims priority, application Great Britain, May 19, 1960, 17,643/60
12 Claims. (Cl. 99—123)

This invention relates to food additives, especially edible protein compositions, and their preparation and use especially in fatty foods such as margarine.

The present invention provides a process for preparing a protein composition suitable for use as an anti-spattering agent for margarine, which comprises suspending the residue left after extracting comminuted soya bean, preferably soya bean flakes, with volatile water-soluble polar and water-insoluble non-polar solvents (both as hereinafter defined) in an acid aqueous medium of pH 4.5 to 5 (substantially the iso-electric point of the protein), the protein being preserved in the undenatured condition throughout. The temperature during all the process steps should be kept relatively low, and preferably should not exceed 50° C. The flakes are preferably not thicker than 0.3 mm.

Preferably the process includes the steps of extracting comminuted soya bean with the polar and non-polar solvents, substantially removing solvent and drying the residue under such conditions as not to denature the protein, before suspending said residue in the acid aqueous medium. Thereafter the suspended residue may be separated from the acid aqueous medium and dried under such conditions as not to denature the protein. Alternatively the suspended residue may be separated from the acid aqueous medium, immediately cooled to a temperature below 0° C. and kept at such a temperature until required.

The protein compositions so obtained are particularly valuable as anti-spattering agents for margarine, especially margarines containing less than about 5% of their volume of air. The invention includes preparing a margarine of reduced tendency to spatter by forming an aqueous mixture suitable for providing the aqueous phase, or part of the aqueous phase, in margarine, said mixture being of pH 4.5 to 5, and containing suspended therein the residue left after extracting comminuted soya bean with the polar and non-polar solvents and preparing a margarine in which the said aqueous mixture constitutes or forms part of the aqueous phase.

In this specification "volatile water-soluble polar solvent" means a liquid of boiling point less than 100° C. which at 20° C. is miscible with water in all proportions and has a dielectric constant of at least 15 and "volatile water-insoluble non-polar solvent" means a liquid of boiling point less than 100° C. which at 20° C. is substantially immiscible with water and has a dielectric constant not greater than 10.

Among non-polar solvents that can be used aliphatic, cycloaliphatic and aromatic hydrocarbons containing 5 to 7 carbon atoms, for example, pentane, hexane, heptane, cyclohexane and benzene are particularly suitable.

Polar solvents that can be used include lower molecular monohydric alcohols, such as methanol, ethanol, n-propanol and iso-propanol, and acetone.

The non-polar and polar solvents can be applied one after the other or simultaneously. In the latter case an azeotropic mixture of a non-polar solvent with acetone is preferred.

The acid used should be one that can be tolerated in small proportions in the product, that is in such proportions as may remain in the product after it has been filtered off from the aqueous medium. The acid should not, therefore, be toxic or offensive or unpalatable in small proportions. It should be stable and water-soluble, preferably of high water solubility, that is capable of dissolving in less than its own weight of water at 20° C. Particularly suitable are highly water-soluble alkane carboxylic acids and hydroxy alkane carboxylic acids such as acetic, propionic, lactic, malic, citric and tartaric acids. Inorganic acids satisfying the requirements set out above, for instance sulphuric, hydrochloric and phosphoric acid, can also be used.

The product obtained after the treatment with a suitable acid, for example dilute acetic acid, lactic acid or citric acid and after filtration, may be dried at moderate temperatures under vacuum, the dry product being comminuted, preferably to particles smaller in diameter than 0.2 mm. Alternatively, the wet filter residue, after pasteurisation and addition of preservatives, may be used as such. Or the wet filter residue can be preserved by deep-freezing. In the latter case no drying after acid treatment is required.

By the method described dry products containing about 0.7% of phosphorus and 75% of protein and having a pleasant neutral taste can be obtained.

As indicated above, the protein compositions of the invention are of particular value when incorporated in fatty foodstuffs consisting of or containing emulsions of water and fat, such for example as margarine.

Margarine is often used for frying and baking. For these applications it is desirable that the margarine should not spatter and should give a fine sediment, not adhering to the frying pan. In order to obtain these desirable properties many expedients have been suggested, including the addition to margarine of monoglycerides, lecithin and egg-yolk. Of these substances egg-yolk is by far the best. Egg-yolk, however, is very sensitive to bacteriological degradation. In consequence, attempts have been made to replace egg-yolk by other proteinaceous compositons, such for example as blood plasma, milk proteins, and sodium caseinate. These compositions, however, do not impart the desired frying properties to margarine.

It has been found that by the use of the protein compositions of the invention the desirable properties discussed above can be imparted to fatty foodstuffs such as margarine. These compositions are particularly effective in completely or partially deaerating margarine, that is margarine containing not more than 5% by volume of non-dissolved air or other gas. The compositions of the invention may be incorporated in the margarine in amounts of 0.1 to 2%, preferably about 1%, of the weight of the margarine.

Omission of any of the process steps of the invention has been found to result in greatly inferior products.

The following examples illustrate the preparation and use of protein compositions according to the invention.

EXAMPLE 1

100 kg. of soya flakes of thickness about 0.2 to 0.3 mm. and water content 11% by weight, were continuously extracted with technical hexane at room temperature until the miscella was substantially free from oil. The flakes were then extracted with technical 96% ethanol in the same way. The extracted flakes were then dried, comminuted, the shells removed and ground to pass a sieve of 50 meshes per cm. The powder was suspended in 1,000 litres of water, after which sufficient 1 N sulphuric acid was added while stirring to adjust the pH to about 4.5. After continuous stirring for half an hour the dispersion was filtered, the residue washed with acetone, and dried under vacuum at a temperature of about 45° C.

70 kg. of a yellowish-white powder were obtained having a protein content of 76.6% and a degree of dispersion in a 1 molar solution of sodium chloride of 36.7%.

EXAMPLE 2

The process was carried out as in Example 1 except that, instead of sulphuric acid a 50% aqueous solution of citric acid was used and after filtering the dispersion the filter residue was kept frozen at a temperature of −15° C. until use.

EXAMPLE 3

The process was carried out as described in Example 2 except that there was used instead of the citric acid a 50% aqueous solution of acetic acid.

paper, forming more or less coherent fat spots on it. The extent of these fat spots is a measure of the spattering. The anti-spattering effect of the various compositions tested by this method is indicated in Table I below by means of figures having the following significance:

10=excellent
8=good
6=sufficient
4=insufficient
2=very bad

All the margarines contained 50 g. of acidified milk, 2 g. of monodiglyceride, 2 g. of lecithin and 12 g. of the protein, per 1,000 g. fat and had a water content of 19.8%. Table I shows the results:

Table I

| | Protein | Extraction solvents | After-treatment | Protein content in percent | Anti-spattering effect in margarine containing | |
|---|---|---|---|---|---|---|
| | | | | | 10% by volume air | 0.5% by volume air |
| 1 | Blank | | | | 4 | 1 |
| 2 | Egg-yolk | | | | 6 | 4 |
| 3 | Soya meal, undenatured | Petroleum ether plus ethanol | | 60.3 | 8 | 5 |
| 4 | ...do... | Petroleum ether plus acetone | | 57.7 | 8 | 5 |
| 5 | ...do... | Petroleum ether plus ethanol | With sulphuric acid at pH 4.5 to 5. | 75.2 | 10 | 10 |
| 6 | ...do... | Petroleum ether plus acetone | ...do... | 75.7 | 10 | 10 |
| 7 | Soya meal, denatured by heat | Petroleum ether plus ethanol | ...do... | 73.1 | 8 | 4 |
| 8 | Soya protein, denatured chemically. | Petroleum ether | Isolation of the proteins with NaOH and then sulphuric acid at pH 4.5 to 5. | 95.0 | 6 | 6 |
| 9 | ...do... | Petroleum ether plus ethanol | ...do... | 96.4 | 8 | 7 |
| 10 | Groundnut protein, denatured chemically. | Petroleum ether | ...do... | 96.1 | 8 | 5 |

EXAMPLE 4

The process was carried out as described in Example 2 except that there was used instead of the citric acid a 50% aqueous solution of lactic acid.

EXAMPLE 5

The process was carried out as described in Example 2 except that there was used instead of the citric acid a 50% aqueous solution of sulphuric acid.

EXAMPLE 6

100 kg. of soya flakes of the kind described in Example 1 were continuously extracted with a mixture of 55% by volume of acetone and 45% by volume of technical hexane until the miscella was substantially free from oil. The extracted flakes were then treated in the same way as in Example 1.

72 kg. of a white powder were obtained having a protein content of 76.6% and a degree of dispersion in a 1 molar solution of sodium chloride of 33.9%.

EXAMPLE 7

Samples of margarine, each containing 1% by weight of a different anti-spattering composition as specified in Table I below were compared. The fatty phase of the margarine had the following composition:

25% of cotton-seed oil
40% of coconut-oil
25% of hardened cotton-seed oil (M.P. 32–34° C.)
5% of palm oil
5% of hardened palm oil (M.P. 40–42° C.)

The anti-spattering compositions were added to the aqueous phase of the margarines during their preparation, the test being made 24 hours after said preparation in the following way:

A pan of diameter 18 cm. was preheated to 200° C. A sheet of filter-paper was fixed horizontally 20 cm. above the bottom of the pan. 50 g. of margarine was put into the pan and heated until the evaporation of water had ceased. Spattered fat was caught by the filter-

EXAMPLE 8

A margarine was made from the fat blend specified in Example 7. The margarine contained 50 g. of acidified milk, 2 g. of monodiglyceride, and 2 g. of lecithin per 1,000 g. of fat and had a water content of 19.8%. It also contained only 0.5% by volume of air. A protein composition obtained according to Example 2 was added to the aqueous phase of the margarine during its preparation in proportions amounting to 0.2 to 1.2% of the weight of the fat.

EXAMPLES 9 TO 11

Example 8 was repeated except that the protein composition used was made:

In Example 9 according to Example 4 (acetic acid);
In Example 10 according to Example 5 (lactic acid); and
In Example 11 according to Example 6 (sulphuric acid).

The improved margarine obtained according to Examples 8 to 11, using various proportions of protein composition to fat ranging from 0.2 to 1.2%, were compared with one another and with a sample of the same margarine without the protein composition by means of the test described above. The results are shown in Table II below.

Table II

| Example | Percentage of protein composition based on weight of fat | | | | |
|---|---|---|---|---|---|
| | 0 | 0.2 | 0.4 | 0.8 | 1.2 |
| | Anti-spattering effect | | | | |
| – (Blank) | 1 | | | | |
| 8 (Citric acid) | | 8 | 10 | 10 | 10 |
| 9 (Acetic acid) | | 8 | 9 | 10 | 10 |
| 10 (Lactic acid) | | 8 | 10 | 10 | 10 |
| 11 (Sulphuric acid) | | 8 | 10 | 10 | 10 |

EXAMPLE 12

A margarine was made according to Example 10 except that the extracted residue was suspended directly in the aqueous liquid which was to constitute the aqueous phase of the margarine, this liquid containing lactic acid in such concentration as to yield a pH of 4.5 to 5, the fat blend was then emulsified with the resulting suspension and the emulsion was processed to give a margarine substantially free from air. The results were comparable with those of Example 10.

I claim:

1. A process for preparing a margarine of reduced tendency to spatter, which comprises forming an aqueous mixture suitable for providing at least part of the aqueous phase in margarine, said mixture being of pH 4.5 to 5, and containing suspended therein the residue left after extracting comminuted soya bean with polar and non-polar solvents, the protein in said residue being undenatured, and preparing a margarine in which the said aqueous mixture constitutes at least part of the aqueous phase, the said residue therein amounting to about 0.1 to 2% by weight of the margarine.

2. A process according to claim 1, wherein the margarine contains not more than 5% of its volume of air.

3. A process according to claim 1, wherein the margarine contains also milk proteins together with small proportions of lecithin and of monoglycerides.

4. A process according to claim 1 wherein the aqueous mixture contains a water-soluble hydroxyalkane carboxylic acid.

5. A process according to claim 4, wherein the acid in the aqueous mixture is lactic acid.

6. A process according to claim 4, wherein the acid in the aqueous mixture is citric acid.

7. A process according to claim 1, wherein the aqueous mixture contains acetic acid.

8. A process according to claim 1 wherein the aqueous mixture contains sulphuric acid.

9. A margarine containing about 0.1 to 2% of its weight of a proteinaceous anti-spattering agent, the agent comprising the residue left after extracting comminuted soya bean with volatile water-soluble polar and water-insoluble non-polar solvents, the residue being suspended in an aqueous mixture having a pH of about 4.5 to 5 and the protein in said residue being undenatured.

10. A margarine according to claim 9 which contains not more than 5% by volume of air.

11. A margarine according to claim 9 which contains not more than about 5% by volume of air, said margarine also containing milk proteins, lecithin and monoglycerides.

12. A process for preparing a margarine of reduced tendency to spatter which comprises the steps of extracting comminuted soya bean with volatile water-soluble polar and water-insoluble non-polar solvents, suspending the residue in an aqueous medium having a pH of about 4.5 to 5, separating the suspended residue from the aqueous medium, immediately cooling the residue to a temperature below about 0° C., storing the residue at a temperature below about 0° C. and thereafter incorporating about 0.1 to 2% by weight of the margarine of the residue in the aqueous phase of the margarine during the manufacture thereof.

References Cited by the Examiner

UNITED STATES PATENTS

| | | | |
|---|---|---|---|
| 2,524,991 | 10/50 | Renner | 99—99 |
| 2,561,333 | 7/51 | Beckel | 99—17 |
| 2,683,091 | 7/54 | Singer et al. | 99—17 X |
| 2,724,649 | 11/55 | Julian et al. | 99—123 |
| 2,881,076 | 4/59 | Sair | 99—17 X |

FOREIGN PATENTS

| | | |
|---|---|---|
| 14,872 | 1913 | Great Britain. |
| 120,836 | 11/18 | Great Britain. |
| 614,593 | 12/48 | Great Britain. |

OTHER REFERENCES

Belter et al., Abstract of Application, 138,528, "Preparation of Soybean Protein Product," vol. 659, pages 1106-7, O.G. June 24, 1952.

Markley, "Soybeans and Soybean Products," vol. I, 1950, Interscience Publishers, New York, 311.

A. LOUIS MONACELL, *Primary Examiner.*

TOBIAS E. LEVOW, ABRAHAM H. WINKELSTEIN, *Examiners.*